BEST AVAILABLE COPY
J. Gunner, Jr.,
Shutter Bower.
No 206. A.I. Patented Sep. 28, 1858.
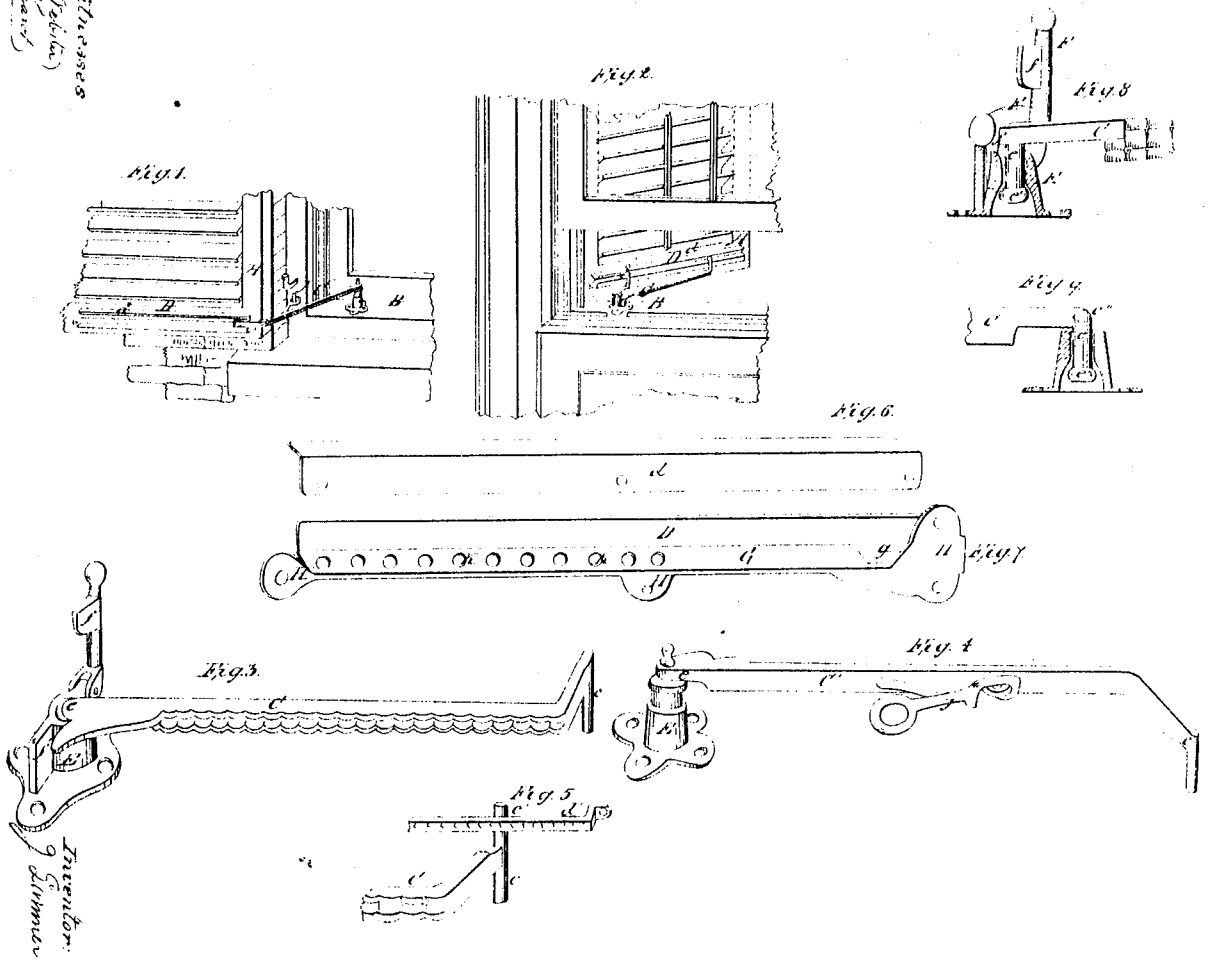
N. PETERS, PHOTO-LITHOGRAPHER, WASHINGTON, D. C.